May 14, 1935. J. F. WISEMAN 2,001,338
DEVICE FOR SPRAYING AN ANTIFREEZE SOLUTION ONTO WINDSHIELDS
Filed May 13, 1932 2 Sheets-Sheet 1
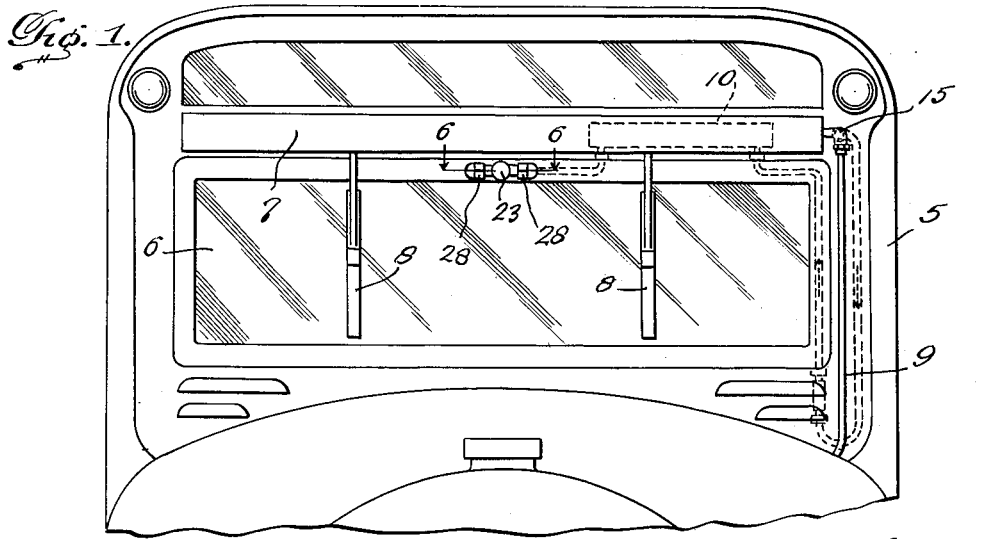
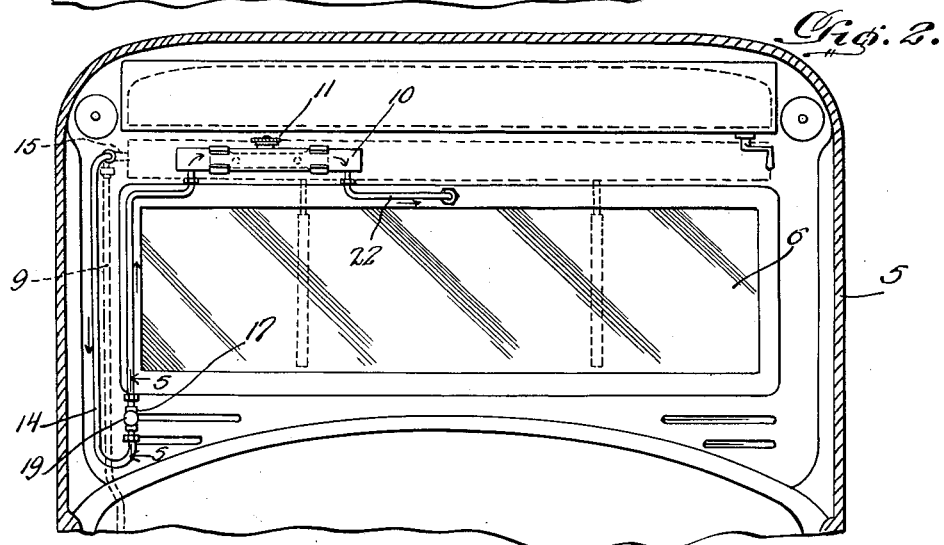
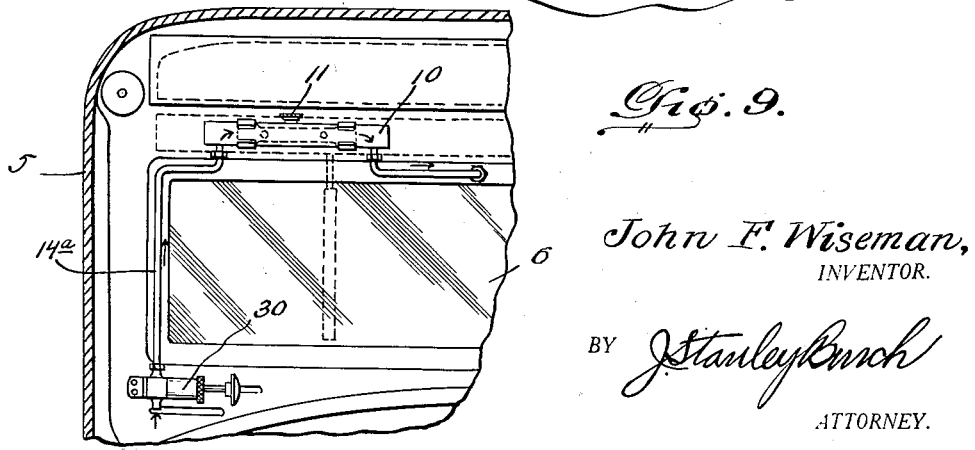
John F. Wiseman,
INVENTOR.
BY J. Stanley Burch
ATTORNEY.

May 14, 1935. J. F. WISEMAN 2,001,338
DEVICE FOR SPRAYING AN ANTIFREEZE SOLUTION ONTO WINDSHIELDS
Filed May 13, 1932 2 Sheets-Sheet 2
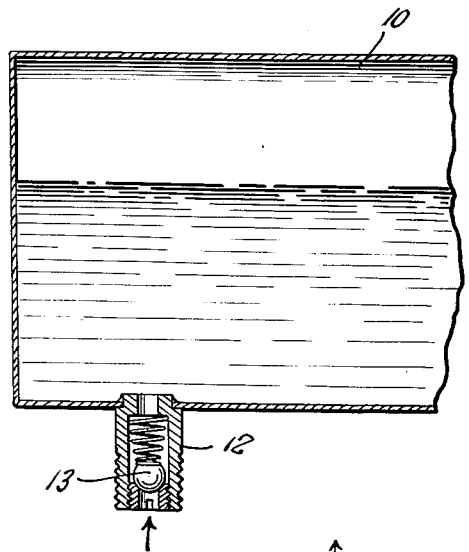
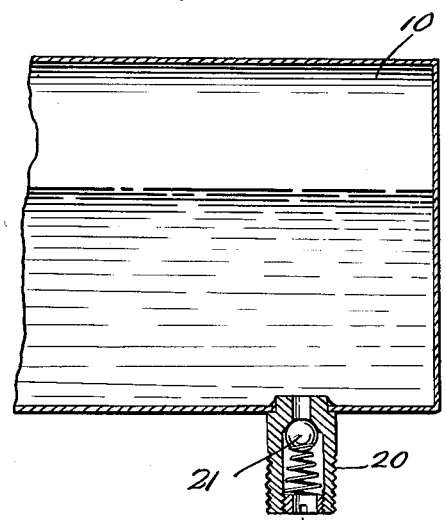
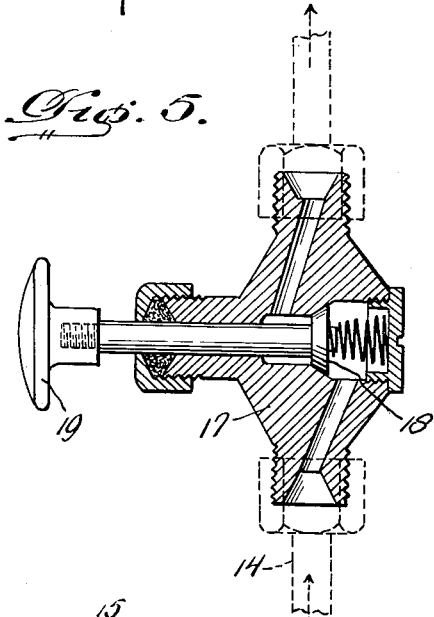
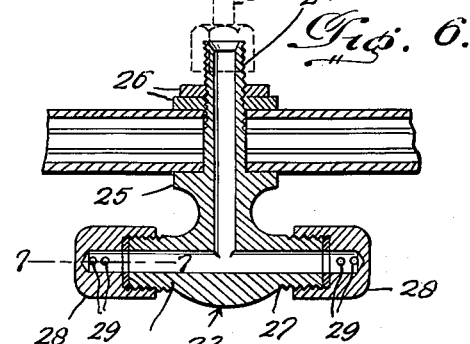
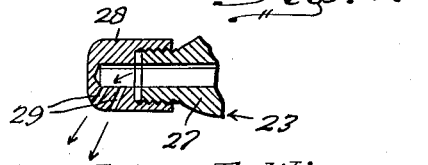
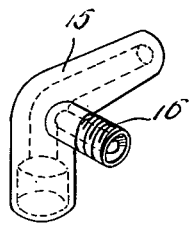
John F. Wiseman,
INVENTOR.
BY J. Stanley Busch
ATTORNEY.

Patented May 14, 1935

2,001,338

UNITED STATES PATENT OFFICE 2,001,338

DEVICE FOR SPRAYING AN ANTIFREEZE SOLUTION ONTO WINDSHIELDS

John F. Wiseman, Dorchester, Mass.

Application May 13, 1932, Serial No. 611,187

2 Claims. (Cl. 20—40.5)

It has been found that the wiping of a windshield alone by an ordinary wiper is under certain conditions not sufficiently positive to prevent accumulation of ice and snow upon the windshield, but that by applying an anti-freeze solution to the windshield and then wiping the same across the surface of said windshield by means of the blade or blades of the windshield wiper, any frozen accumulation is loosened and positively wiped aside to insure clear vision.

It is accordingly the primary object of the present invention to provide an improved device adapted to be employed in conjunction with an ordinary windshield wiper, for spraying an anti-freeze solution onto the windshield in the path of movement of the wiping element or elements.

A further object of the invention is to provide a device of the above kind which may be readily installed for use, which is simple and inexpensive in construction, and which is thoroughly reliable in operation.

The invention consists in the novel form, combination and arrangement of parts hereinafter more fully described, shown in the accompanying drawings, and claimed.

In the drawings:

Figure 1 is a fragmentary front elevational view of a bus equipped with a device embodying the present invention.

Figure 2 is a fragmentary transverse sectional view taken through the body of the bus rearwardly of the windshield and looking forwardly toward the latter to reveal details of the device illustrated in Figure 1.

Figure 3 is a fragmentary longitudinal sectional view of the intake end portion of the storage tank for the anti-freeze solution.

Figure 4 is a view similar to Figure 3 of the outlet end portion of said tank.

Figure 5 is a sectional view of the valve for controlling admission of air under pressure to the storage tank.

Figure 6 is an enlarged fragmentary horizontal section on line 6—6 of Figure 1, showing the spraying head and the manner of mounting the same in the windshield frame.

Figure 7 is a fragmentary section on line 7—7 of Figure 6.

Figure 8 is a perspective view of the three-way fitting employed to derive air pressure from the supply line of the windshield wiper for operation of the spraying device; and Figure 9 is a view similar to Figure 2, showing a modification of the invention.

Referring more in detail to the drawings, I have shown at 5, the body of a bus or like public vehicle, having mounted on the front thereof above the windshield 6 the motive means 7 of a conventional windshield wiper having a pair of wiping elements 8 engaging the outer surface of the windshield and reciprocable by the motive means 7 for keeping substantially said entire surface free of accumulations of rain, snow and ice. In most cases, the motive means 7 of this type of windshield wiper is actuated by air under pressure supplied by a line 9 from a suitable source, not shown, such as the compressed air storage tank of the vehicle from wnich air under pressure is derived for actuation of the vehicle brakes.

The present invention embodies a storage tank 10 for holding a supply of suitable anti-freeze solution or liquid removably mounted in the clips 10a on the inside of the vehicle body 5 directly over the left hand end portion of the windshield 6 as viewed in Figure 2. This tank has a top filler neck closed by a suitable cap 11 which may be removed to facilitate replenishing the supply of solution or liquid in the tank, and such cap also preferably has a vent which may be manually opened to relieve the air pressure when removing the cap for replenishing the supply of solution or liquid therein. At the left hand end of the tank 10, the latter is provided with a bottom air intake 12 normally closed by a spring seated check valve 13 and connected with the air supply line 9 by means of a pipe connection 14 and a three-way fitting 15, the pipe connection 14 being detachably coupled to the air intake 12. The fitting 15 is interposed between the line 9 and the inlet of the motive means 7, and has a lateral branch 16 to which the pipe connection 14 is connected, thus permitting ready passage of the connection 14 through the front wall of the vehicle body to the interior of the latter where the line 14 is arranged, the line 9 being arranged exteriorly of the vehicle body for connection with the motive means 7 as shown clearly in Figure 1. The pipe connection 14 extends downwardly adjacent the left hand side of the vehicle body to a point beneath the windshield 6 where it has interposed therein a control valve 17 arranged within convenient reach of the driver or operator of the vehicle. The control valve 17 includes a movable valve member 18 which is normally seated under air and spring pressure, and which has a suitable handle 19 adapted to be pressed for manually unseating the same. The connection 14 then extends from the outlet side of valve 17 upwardly along the adjacent side of the windshield 6 to the air inlet 12 of tank 10. Tank 10 is provided at its other or right hand end with a bottom outlet 20 for the anti-freeze liquid or solution, which outlet is normally closed by a spring seated check valve 21. The outlet 20 is connected by a pipe connection 22 with the inlet of a spray head mounted in the upper frame member of the windshield intermediate the ends of said windshield, the pipe connection 22 being detachably coupled to said outlet 20. As shown, the spray head 23 has a reduced stem 24 extending through an opening in the windshield frame and clamped in place by means of a flange 25 of the head 23 at the juncture of the stem 24 with the body of the spray head and clamping nuts threaded on the stem 24 as at 26. The stem 24 is hollow and constitutes the inlet of the spray head, while the body portion of the spray head which is located in front of and above the windshield has lateral outlet branches 27 provided with spray nozzles 28. The nozzles 28 have small openings 29 through which the liquid or solution is adapted to be sprayed in fine jets onto the outer surface of the windshield 6, said openings extending downwardly and rearwardly as well as laterally toward the respective wiping elements 8 as will be evident.

In operation, the movable valve member 18 of the control valve 17 is momentarily opened by pressing upon the handle 19 and quickly releasing the latter. This allows a charge of compressed air to pass from supply line 9 through pipe connection 14 and inlet 12 of tank 10, unseating the check valve 13 and passing through the liquid into the upper portion of tank 10. This places the liquid in tank 10 under pressure so as to cause the check valve 21 to be opened and to force the anti-freeze liquid through outlet 20, pipe connection 22 and spray head 23 onto the surface of the windshield. The liquid will thus be sprayed onto the windshield for a limited period of time until the air pressure which has been admitted to tank 10 is exhausted or relieved. Ordinarily this limited supply of liquid to the windshield will be sufficient to enable the wiping element to clear accumulations on said windshield for a considerable period of time. Effective distribution of the liquid is enhanced by reason of the discharge of the liquid onto the windshield in fine jets, and the above operation may be repeated as often as found necessary by merely pressing the handle 19 to open the control valve momentarily. Obviously, check valve 21 will prevent flow of the liquid from tank 10 by gravity, or when not desired. Likewise, the check valve 13 prevents passage of liquid from the tank 10 into the pipe connection 14 should the supply of air under pressure fail.

In Figure 9, I have shown a modified embodiment of the invention in which the pipe connection 14a connects the outlet of a hand operated air pump 30 with the inlet 12 of tank 10, the connection of pipe connection 14a with the pressure supply line 9 being eliminated, and the hand pump 30 having a check valve controlled air inlet open to the atmosphere. The pump 30 is of the type and construction disclosed in my copending application for patent upon Device for spraying an anti-freeze solution onto windshields, Ser. No. 611,188, filed May 13, 1932, in which a manually operable plunger is adapted to be retracted automatically by means of a compression spring for drawing a charge of air into the pump, and is adapted to be manually actuated for forcing the charge of air through the pipe connection 14a into the tank 10 so as to place the liquid or solution in the latter under air pressure. By these means, a predetermined limited quantity of liquid or solution will be sprayed onto the windshield upon each actuation of the pump 30. Such pump is preferably mounted below the windshield at the left hand end of the latter within convenient reach of the driver or operator of the vehicle. This modified embodiment of the invention may be readily and cheaply installed and may be preferred in some cases to the construction of Figures 1 to 8 inclusive. This is particularly true in case the vehicle is equipped with a windshield wiper operated by electrical or vacuum motive means. Otherwise, the construction of Figure 9 corresponds to that of Figures 1 to 8 inclusive insofar as the tank 10, pipe connection 22 and spray head 23 is concerned. When the liquid or solution is completely exhausted from tank 10, the inlet 12 and the outlet 20 of said tank may be uncoupled from pipe connections 14 or 14a and 22 to permit removal of said tank for being refilled or replaced by another filled tank, the check valves 13 and 21 preventing leaking of the liquid or solution from the refilled tank or the other filled tank while being mounted in the clips 10a and coupled to the pipe connections 14 or 14a and 22.

While I have described specific embodiments of the invention, it will be apparent that minor changes may be made in the specific details herein set forth without departing from the spirit of the invention as claimed.

What I claim as new is:

1. In a device for spraying an anti-freeze liquid onto the windshield of a motor vehicle, a storage tank for the liquid provided with a top filling opening and having a bottom inlet and a bottom outlet normally closed by spring-seated check valves, said check valves being arranged to be unseated by pressure to respectively admit air under pressure into the tank and to permit discharge of the liquid under pressure from said tank, means removably mounting said storage tank in the motor vehicle above said windshield, a spray head mounted at the top of and arranged to discharge the liquid onto the outer surface of the windshield, a pipe connection between the spray head and the outlet of said tank detachably coupled to the latter, and manually controlled means for supplying air under pressure to said tank including an air supply line detachably coupled to the inlet of said tank.

2. In a device for spraying an anti-freeze liquid onto the windshield of a motor vehicle, the combination with an air supply line arranged outside the vehicle at one side of the windshield, of a storage tank for the liquid removably mounted in the vehicle above the windshield and having a bottom inlet and a bottom outlet, check valves normally closing said inlet and said outlet, manually controlled means for delivering air under pressure at will from said air supply line and conducting the same to said inlet of the storage tank, and a spray head connected with the outlet of the storage tank and mounted at the top of the windshield, said spray head having a nozzle arranged to discharge the liquid onto the windshield.

JOHN F. WISEMAN.